United States Patent

Miyoshi et al.

[15] 3,649,111
[45] Mar. 14, 1972

[54] SUB-STANDARD MOTION PICTURE CAMERA

[72] Inventors: Katsuto Miyoshi; Kohji Ichie, both of Nagoya, Japan

[73] Assignee: Elmo Company Limited, Nagoya, Japan

[22] Filed: July 23, 1970

[21] Appl. No.: 57,241

[30] Foreign Application Priority Data

Aug. 21, 1969 Japan..................................44/65663

[52] U.S. Cl.............................................................352/90
[51] Int. Cl.......................................................G03b 21/32
[58] Field of Search........................352/90; 95/18 R; 355/39

[56] References Cited

UNITED STATES PATENTS 2,374,475  4/1945  Eagle et al.............................95/18 R Primary Examiner—Donald O. Woodiel
Attorney—Wenderorth, Lind & Ponack

[57] ABSTRACT

A sub-standard motion picture camera has two selectively operable lens systems, one of which is a main lens system for obtaining a normal shot, and the other is an auxiliary lens system for obtaining a closeup shot or tilting. To provide the auxiliary lens system, the camera has in its housing an opening or a light opening within which an auxiliary lens is disposed, the opening being closed or opened properly to render the auxiliary lens system operative or inoperative.

2 Claims, 1 Drawing Figure

Patented March 14, 1972 3,649,111
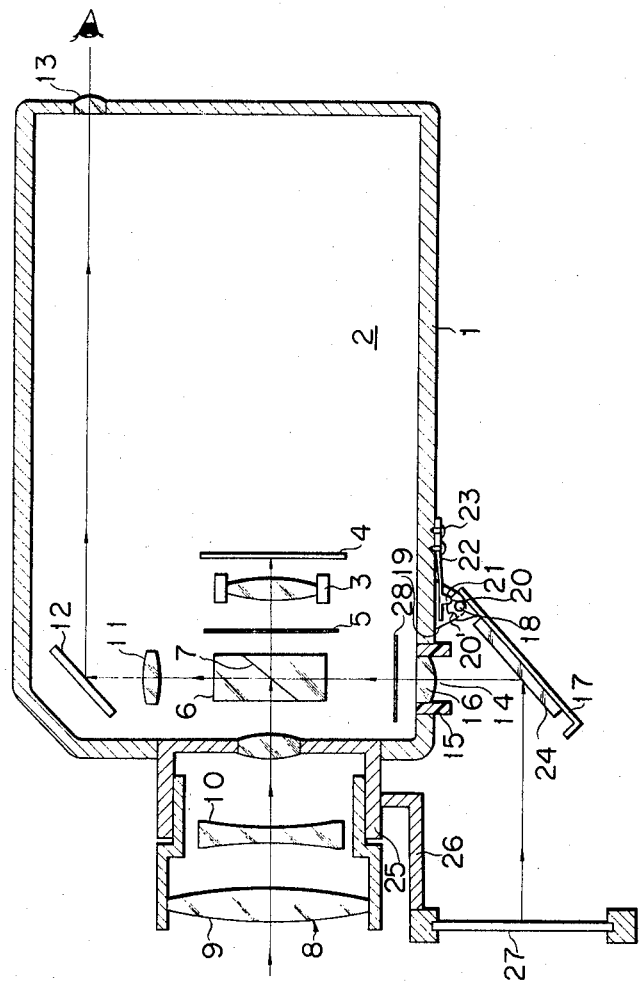
KATSUTO MIYOSHI and
KOHJI ICHIE,
INVENTORs
BY *Wenderoth, Lind & Ponack*
ATTORNEYs

SUB-STANDARD MOTION PICTURE CAMERA

This invention relates broadly to the art of photography, and more particularly to a sub-standard motion picture camera capable of obtaining, in addition ordinary shots, title shots, closeup shots, double exposed shots (superimposition).

In a art of making the movie, when taking the title letters on a title card and the background thereof for a motion picture film, the double exposure technique is very frequently used, which technique consists of taking at first the background, i.e., the title background by the ordinary shooting method and then superimposing the title letters thereon after rewinding the film for the length of the background shot. This method, however, involves such disadvantageous features that an additional operation is required to reverse the film once exposed, and that a camera operator encounters difficulty in correctly measuring the length of film to be rewound. Furthermore, it is impossible to apply this method to a motion picture camera of the type employing a super 8 cartridge, because the film therein cannot be rewound.

For the purpose of overcoming the disadvantages described above, superimposing devices have been proposed which enable the motion picture camera to simultaneously take the desired title background such as a landscape and human beings together with the title of the movie. Even in such well known superimposing devices, however, there is still a disadvantage that they have to be always carried separately from the camera since they are used as a camera accessory and must be mounted thereon with screws or the like each time the camera operator wishes to obtain superimposed shots timely and effectively. Therefore, it will be appreciated that these conventional devices are unsuitable for outdoor shooting which fundamentally requires lightweight equipment.

In addition, in making the movie, the closeup shooting technique is often used in moderation, in order to give the movie an accent and heighten its expressive effect. With the conventional sub-standard motion picture camera, in order to obtain the closeup shots, it has been proposed to equip a photographic lens with a separate attachment lens for purposes of closeup shooting. This method of obtaining the closeup shots, however, has disadvantages features similar to those of the aforementioned superimposing devices, i.e., the attachment lens also has to be always carried separately from the camera and requires an additional operation to attach it to the photographic lens when the necessity arises for taking the closeup shots.

As will be readily understood from the foregoing, it is to be emphasized that these conventional sub-standard motion picture cameras cause much inconvenience to the camera operator, which arises from the fact that, for instance, when it is desired to changeover from the superimposing shooting to the ordinary shooting, the superimposing device, must be detached from the camera, and when changing from the ordinary shooting to the closeup shooting, the closeup shooting attachment lens has to be attached in front of the ordinary photographic lens. It will be therefore understood that such an inconvenience does not make it easy to use the said various kinds of shooting techniques easily and quickly when necessary.

It is accordingly a principal object of the present invention to provide a sub-standard motion picture camera with main and auxiliary lens systems, which latter system is very efficient for taking the closeup shots or titling is inexpensive to manufacture, is simple in its construction, and is arranged compactly.

It is another object of the invention to provide a sub-standard motion picture camera capable of simultaneously shooting a scene through the main lens system as well as, for instance, a title of the movie by operating the auxiliary lens system without the necessity for any special attachment or accessory and with ease.

It is still another object of the invention to provide a sub-standard motion picture camera in which The auxiliary lens system comprises an auxiliary focusing lens for taking the closeup shot, with ease and without the necessity of mounting a closeup lens in front of the main photographic lens system.

It is a further object of the invention to provide a sub-standard motion picture camera in which both the lens systems can be selectively shaded, whereby a camera operator is allowed to apply such various kinds of shooting techniques as an ordinary shooting, a title shooting, a closeup shooting and a double exposure shooting, without any parallax when viewing a scene from a view finder.

With a view to achieving these objects of the invention and to overcome the above-mentioned disadvantages of the conventional cameras, we have devised a new type of sub-standard motion picture camera by utilizing the structural characteristics of the sub-standard motion picture single lens reflex-type camera the main lens system of which includes, in addition to an ordinary photographic lens, a beam splitter, e.g., a dot mirror, a half mirror of a half prism serving to guide a part of the light beam from an object to a viewfinder eyepiece and the remainder of the light to a film. The new type of the sub-standard motion picture camera is characterized by a housing defining an interior, a first lens system including a beam splitter disposed in the path of a first image beam to split it into two parts which travel respectively toward a film within said interior, and a finder said housing being provided with an opening or a light opening, a second lens system including an auxiliary lens disposed between said beam splitter and said opening so that a second image beam incident thereon is received on said beam splitter, and means for shielding said lighting opening from said second image beam when it is desired to render said second lens system inoperative. An object to be shot can be recorded by the auxiliary lens on the film, which object is spaced from the camera to substantially correspond to the distance between the front end of the lens mount of the main focusing lens member 9 and the sensitive surface of the film. According to this improved camera, the second image from the title placed at a set position near the main lens in the first lens system is directed to the film via the opening, the auxiliary lens, the beam splitter and a master lens in the first lens system, whereby it is possible to take the main picture simultaneously with the title in double exposure, without the use of a special lens attachment as needed by the conventional cameras, and also to simply take closeup shots without mounting a special closeup shooting lens, because the auxiliary lens is built-in at a suitable position in the camera, thus enabling the camera operator to take an ordinary shot, or a title or a closeup shot as he desires, only by shutting off either of the lens systems.

The invention will become more readily apparent from the following detailed description taken in conjunction with the accompanying drawing which is a diagrammatic view of an embodiment of a sub-standard motion picture camera constructed in accordance with the principles of the invention.

Referring to the drawing, a sub-standard motion picture camera comprises a housing 1 within which various conventional mechanisms such as an aperture and masking mechanism, an intermittently operated film feeding mechanism, an upper and lower film takeup mechanism, and a film threading mechanism are enclosed, but which are not shown because they are not the subject matter of the invention. The housing 1 has a chamber 2 in which is located an objective lens 3 (master lens), behind which is located a film 4 moved in a step-by-step motion, as known to the art, by the intermittently operated film feeding mechanism, and ahead of which is located a lens diaphragm 5 adjustable to assure a correct exposure.

In front of the diaphragm 5, is located a beam splitter 6, e.g., a half mirror, a half prism or a dot mirror, having an interface 7 inclined at 45° to the optical axis. In front of this beam splitter, there is mounted a conventional lens assembly 8 of the zoom type with variable focus. This zoom lens 8 comprises a focusing lens member 9 and a moving lens member 10 with a suitable moving range as known to the art.

A part of the light incident on the zoom lens 8 is reflected by the interface 7 upwardly and passes through a viewfinder objective 11 and a deflector means 12 in the form of a mirror to a viewfinder eyepiece 13, while the main part of the light passes through the reflecting interface 7 and the objective lens 3 to the intermittently travelling film 4, whereby the camera operator can shoot a main scene while at the same time viewing it from the viewfinder eyepiece 13.

The constructions and functions described above are the same as those of the conventional single-lens reflex motion picture camera and therefore need not be further described.

According to the present invention, the motion picture camera is further provided on one side, in this example, the bottom wall, of its housing 1 with an opening or a light opening 14 of a predetermined diameter into which a cylindrical member 15 is fixedly fitted, the member is being made of a light shielding material such as is commercially available under the trade mark "MOLTOPRENE." The light opening 14 is disposed on the opposite side of the finder system with respect to the interface 7 of the beam splitter 6 and on the reverse extension of the beam path from the interface 7 to the finder system. Into the cylindrical member 15 is fitted an auxiliary lens 16 having a predetermined focal length so that an object such as a title to be shot (described hereinafter) is clearly focused on the film 4 in cooperation with the master lens 3, said object to be shot being spaced to substantially correspond to the distance between the front end of the lens mount of the main focusing lens member 9 and the sensitive surface of the film 4. In order to allow the opening 14 to be opened or closed as necessary, a shading plate 17 is mounted for pivotal motion on a pin 18 which is carried at its both ends by semielliptical ears 19 on the plate. The plate 17 is provided at its pivot carrying end portion with two notches 20 and 20', each selectively engaging a projection 21 on a flat spring 22 which at one end is secured to the housing 1 by suitable conventional means such as screws as shown at 23. The plate 17 is further provided on its inner side facing the opening 14 with a securely mounted reflecting mirror 24.

With the shading plate 17 thus constructed, where the notch 20 in the plate 17 is in engagement with the projection 21 on the spring 22, the plate 17 and the reflecting mirror 24 are both retained in an open position in which these make an angle of 45° with respect to the auxiliary focusing lens 16, and where the notch 20' is in engagement with the projection 21, the parts are held in a closed position by the action of the spring 22, thus preventing any light from passing through the opening 14.

On a lens mount 25, there is detachably mounted a frame structure 26 for supporting a card 27 to be shot such as a title card and a photograph. The card 27 is vertically arranged in a predetermined position so that the auxiliary focusing lens 16 is focused on that card. Therefore, it will be appreciated that the light reflected from the card 27 travels until it reaches the reflecting mirror 24, and then it is reflected through the auxiliary focusing lens 16 and a conventional diaphragm 28 similar to the diaphragm 5 to the beam splitter 6, and that a part of the light incident on the beam splitter 6 passes through the interface 7, the viewfinder objective 11 and the deflector mirror 12 to the viewfinder eyepiece 13 while at the same time the remaining part of the light is reflected by the interface 7 rightwardly and passes through the diaphragm 5 and the objective lens 3 to the film 4.

In the Figure illustrated, the shading cover 17 attached to the camera housing is set in the open position so that the double exposure or superimposition can be carried out, that is, the camera operator can simultaneously take the ordinary shot as well as the closeup shot of, for instance, the title, in making the movie.

In operation, when it is desired to take the exclusive shot of the title alone, this is accomplished by shutting off the light incident on the zoom lens 8 by the use of a conventional lens cover (not shown). The method of closeup shooting according to the invention is very useful to transcribe a printed matter such as a newspaper, a magazine and so on, because the picture on the card 27 disposed close to the front end of the lens mount of the main focusing lens member 9 can be clearly focused on the film 4. The camera can be made ready for the closeup shooting of the printed matter superposed on a suitable flat plane by placing the camera vertically on the printed matter with its zoom lens facing down, and then adjusting the position of the camera relative to the letters on the printed matter to be shot while viewing the letters through the viewfinder. This has the advantage of not requiring the maintaining of the camera stationary by the use of a tripod as in the conventional closeup shooting method. Where the operator wishes to take the title alone while holding the camera in his hand, he can do so while shielding the light incident on the zoom lens 8 by means of either his own hand or the lens cover. Furthermore, when it is desired to obtain an ordinary closeup shot, it is only necessary to position the camera so that the object to be shot is located in the vicinity of the front end of the lens mount of the main focusing lens member 9.

When it is desired to changeover from closeup shooting or titling or superimposing shooting to ordinary shooting, the operator is merely required to turn the shading cover 17 towards the opening 14 in the camera housing, i.e., to its closed position. At this time, the reflecting mirror 24 mounted on the holder 17 can be maintained in light-tight contact with the light shielding member 15 of "MOLTOPRENE," whereupon the light is allowed to fall on the zoom lens 8 exclusively but not on the auxiliary lens 16, resulting in obtaining of an ordinary shot of the subject to be shot.

Although the invention has been described and illustrated with reference to a single preferred embodiment thereof, it is to be understood that various changes in the details of constructions and the arrangement and combination of parts may be resorted to without departing from the spirit and scope of the invention. For instance, the reflecting mirror 24 mounted on the holder 17 may be omitted. In this case, the frame construction 26 for supporting the card 27 has to be mounted on the camera housing 1 instead of the lens mount 25 so that the card 27 is caused to face towards the auxiliary lens 16, and it will be readily understood that the shading cover 17 need not be maintained in the 45° inclined position when shooting the letters or picture on the card 27. The cover 17 is required only to be maintained out of the optical path of the auxiliary lens system.

What we claim is:

1. In a sub-standard motion picture camera of the single lens reflex type, the combination of a housing defining an interior, a first lens system including a beam splitter disposed in the path of a first image beam for splitting the beam into two parts directed respectively toward a finder and toward a film within said interior, said housing having a lighting opening, a second lens system including a supplementary lens disposed between said beam splitter and said opening so that second image beam incident thereon is received on said beam splitter, and means for shielding said opening to block off said second image beam when it is desired to render said second lens system inoperative.

2. The combination as claimed in claim 1, wherein said shielding means is provided on its side facing to said opening with a reflecting mirror and is pivotably mounted on said housing and selectively movable between open position in which said second lens system is operative and a closed position in which said second system is inoperative.

* * * * *